(12) United States Patent
Hudson

(10) Patent No.: US 6,510,106 B2
(45) Date of Patent: Jan. 21, 2003

(54) SYSTEMS AND METHODS FOR LOCATING SUBSURFACE OBJECTS

(75) Inventor: Steven Martin Hudson, Sturminster Newton (GB)

(73) Assignee: Flight Refuelling Limited, Dorset (GB)

( * ) Notice: Subject to any disclaimer, the term of this patent is extended or adjusted under 35 U.S.C. 154(b) by 0 days.

(21) Appl. No.: 09/982,002

(22) Filed: Oct. 19, 2001

(65) Prior Publication Data

US 2002/0033758 A1 Mar. 21, 2002

Related U.S. Application Data

(63) Continuation of application No. PCT/GB00/01505, filed on Apr. 18, 2000.

(30) Foreign Application Priority Data

Apr. 20, 1999 (GB) .............................................. 9909040

(51) Int. Cl.[7] .................................................. G01S 3/00
(52) U.S. Cl. ..................................................... 367/127
(58) Field of Search ................................. 367/131, 118, 367/127; 342/22

(56) References Cited

U.S. PATENT DOCUMENTS

| | | |
|---|---|---|
| 4,088,998 A | 5/1978 | Rawls |
| 4,163,977 A | 8/1979 | Polstorff |
| 4,888,593 A | 12/1989 | Friedman et al. |
| 4,961,413 A | 10/1990 | Takhashi et al. |
| 5,240,350 A | 8/1993 | Yamaguchi et al. |
| 5,374,936 A | 12/1994 | Feng |
| 5,627,800 A | 5/1997 | Kotler et al. |

FOREIGN PATENT DOCUMENTS

| | | |
|---|---|---|
| EP | 0 120 520 | 10/1984 |
| EP | 0 385 600 | 9/1990 |
| FR | 2 720 840 | 12/1995 |
| GB | 1 544 447 | 4/1979 |
| GB | 2 326 713 | 12/1998 |
| GB | 2 331 365 | 5/1999 |
| JP | 03-257321 | 11/1991 |

OTHER PUBLICATIONS

Singh et al.;Docking For An Autonomous Ocean Sampling Network; Oct. 2001;IEEE Journal of Oceanic Engineering; vol. 26, No. 4; pp. 498–514.

Lucas, J., University of Liverpool, Free Electron Laser Research Group, *liv.ac.uk*, pp. 9, (Apr. 19, 1999).

Lucas, J., University of Liverpool, *liv.ac.uk*, 9 pages (Apr. 30, 1999).

*Primary Examiner*—Daniel T. Pihulic
(74) *Attorney, Agent, or Firm*—Finnegan, Henderson, Farabow, Garrett, & Dunner, L.L.P.

(57) ABSTRACT

A subsurface object location apparatus for determining the position of an object 2 located below a surface S such as a land surface, the surface of the sea or a seabed. A subsurface unit 1 having transmitter means for transmitting inductive signals is mounted on the object 2. A plurality of surface units 3 are disposed at spaced locations at the surface S. Each surface unit 3 has receiver means arranged for receiving the inductive signals. Processing means 4 are provided for determining the location of the object 2 using time difference of arrival techniques in respect of the signals received at the surface units. Cyclic correlation is used in determining the times of reception of signals at the surface units.

16 Claims, 2 Drawing Sheets

SYSTEMS AND METHODS FOR LOCATING SUBSURFACE OBJECTS

CROSS REFERENCE TO RELATED APPLICATIONS

Figure 1:
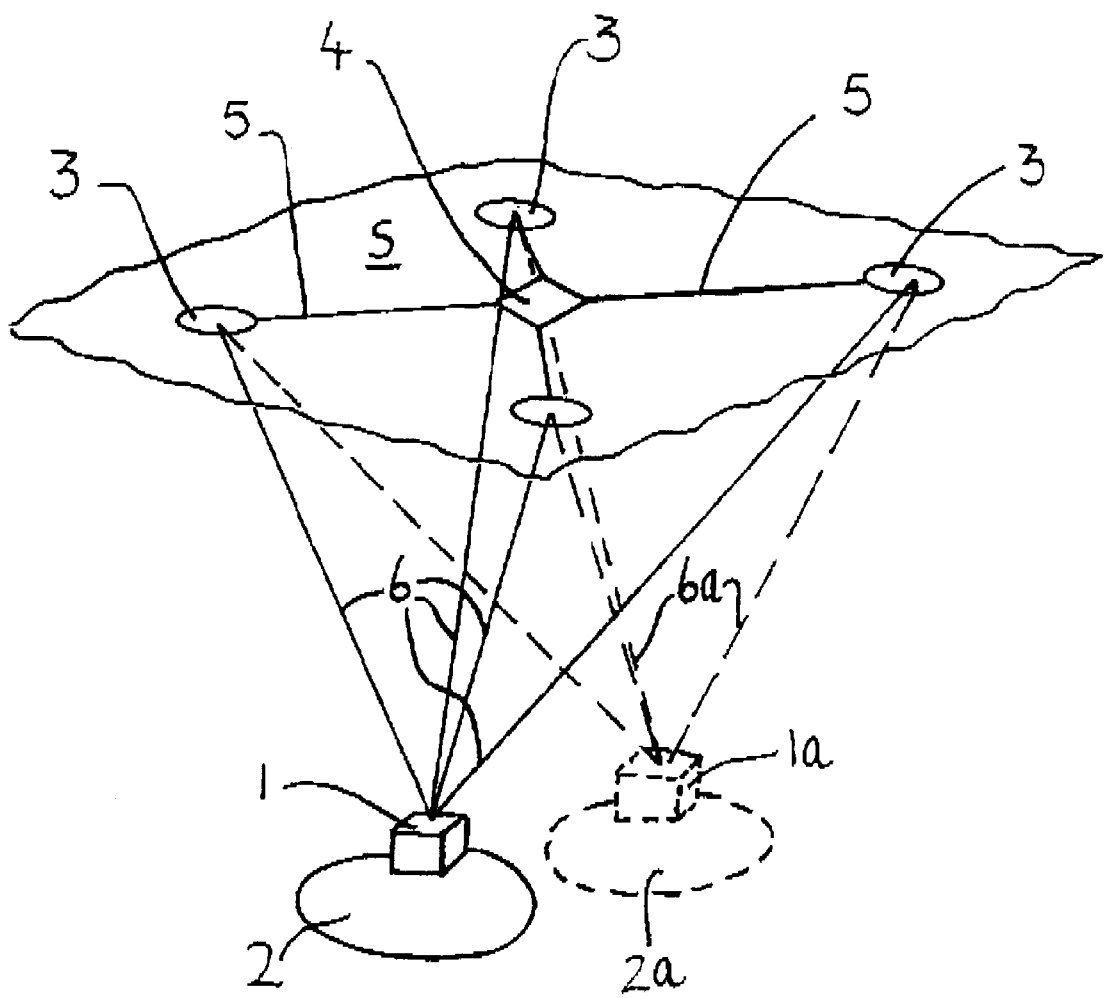

This application is a continuation of international application number PCT/PCT/GB00/01505, filed Apr. 18, 2000, and claims priority of Great Britain Patent Application No. 9909040.9, filed Apr. 20, 1999.

This invention relates to systems and methods for locating subsurface objects.

In this specification the expression subsurface object includes objects located below a land surface, below the surface of a body of water and below a seabed.

In a number of circumstances it is desirable to be able to determine the position of a subsurface object. Examples of such circumstances include the determination of the position of an underwater vehicle which, for example, is being used to inspect a pipeline and the determination of the position of a drilling tool during the directional drilling of an oil well.

Existing systems for determining the position of subsurface objects have disadvantages.

It is an object of the present invention to provide a system for determining the position of subsurface objects which alleviates at least some of the problems associated with existing systems.

According to one aspect of the present invention there is provided a subsurface object location system for determining the position of an object located below a surface, comprising a subsurface unit having transmitter means and being arranged to be mounted on the object, a plurality of surface units having receiver means and being arranged to be disposed at spaced locations at the surface, and processing means for determining the times of reception at the plurality of receiver means, of a signal transmitted from the transmitter means and determining the location of she object on the basis of the times of reception.

According to another aspect of the present invention there is provided a method for determining the position of an object located below a surface, comprising the steps of:

is mounting a subsurface unit having transmitter means on the object;

disposing a plurality of surface units having receiver means at spaced locations at the surface;

using the transmitter means to transmit a signal from the object;

determining the reception times of the signal at each of the plurality of receiver means; and determining the location of the object on the basis of the times of reception.

Preferably the processing means is arranged to compare the times of reception of the signals and to determine the location of the object on the basis of said comparison.

Said method preferably includes the steps of comparing the times of reception of the signals and determining the location of the object on the basis of said comparison.

Preferably at least three surface units are provided, more preferably still at least four surface units are provided.

In general there are four unknowns, namely three spatial co-ordinates and time. Not all of these unknowns need be determined using the reception times of the signals. For example depth may be determined by pressure sensors or other means. Further, or alternatively, a time reference may be provided at the transmitter. If all four unknowns have to be determined by time of reception, at least four surface units are required.

Subsurface, especially underwater, object location systems may use acoustic links. The use of acoustic links has disadvantages at least in part because of the multipath dispersion which occurs. Preferably the transmitter and receiver means are arranged respectively to transmit and receive inductive signals and in use the signals transmitted by the transmitter means are inductive signals. The use of inductive signals is advantageous because any multipath dispersion effects are minimized and the attenuation of the magnetic vector as electromagnetic radiation passes through water and many types of lithology is significantly lower than that of the electric vector.

Preferably a central unit is provided which is connected by a communication link to each of the surface units. The central unit may comprise a surface unit. Each surface unit may be arranged to relay signals to the central unit via the respective link. In some embodiments each surface unit is connected to the central unit by a high quality link having known characteristics. The central unit may be arranged to compare the time of reception by each surface unit, of signals transmitted from the subsurface unit. The central unit may be arranged to determine the time of reception of the signals by each surface unit on the basis of the time of reception of a relay signal from each surface unit and the known characteristics of the high quality links.

Each high quality link preferably has a high bandwidth. A high quality link is a link which has characteristics which can be determined accurately enough and remain within such tolerances that the time delay introduced by each link can be determined to an accuracy which allows the position of a subsurface object to be determined to the accuracy required in the particular circumstances. Such embodiments have the advantage that no master clock is required.

In other embodiments each surface unit is arranged to determine the time of reception of a signal from the subsurface unit by reference to a master clock and to relay an appropriate signal via the respective link to the central unit. The central unit may be arranged to determine the position of the subsurface object on the basis of the signals received from the surface units. The master clock may be that available via GPS. Such embodiments have the advantage that high quality links are not required.

The signals used to determine the position of the object may also be used to carry data. The subsurface unit may comprise receiver means for receiving signals from the surface. One or more surface unit and/or the central unit may comprise transmitter means for transmitting signals to the subsurface unit.

The object location system may be arranged to operate where the signals pass through earth/land and/or seawater.

The subsurface object location system may be a subsea object location system.

Figure 2:
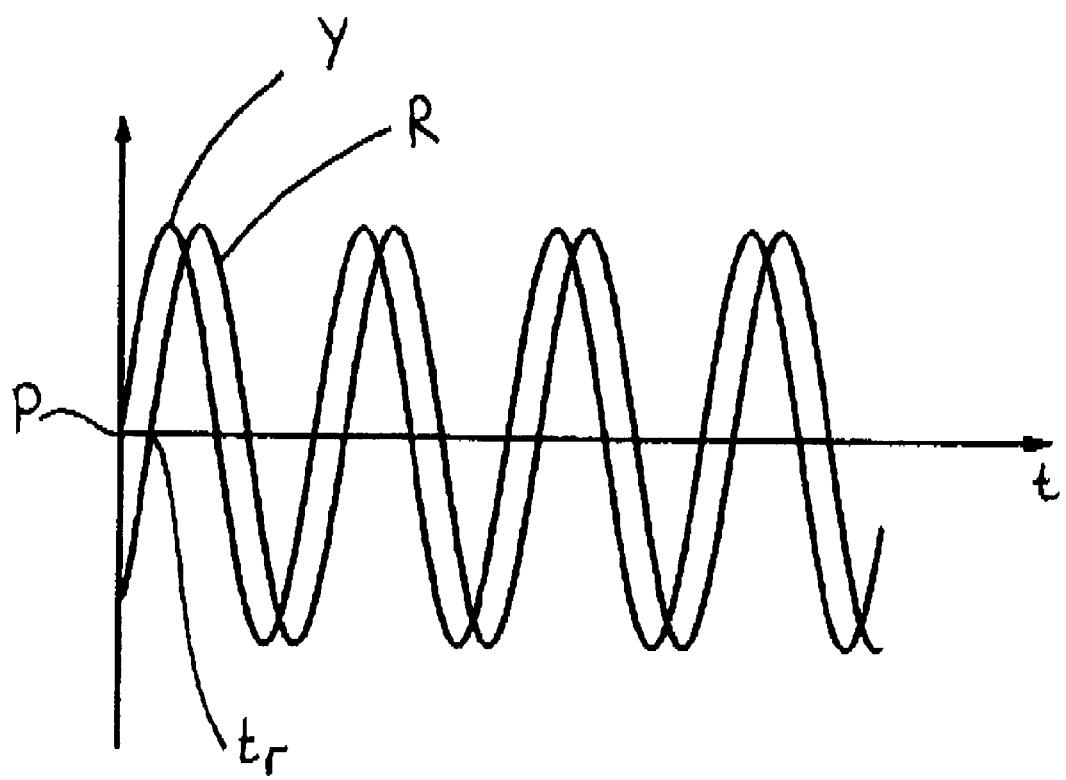

Embodiments of the present invention will now be described, by way of example only, with reference to the accompanying drawings in which:

FIG. 1 schematically shows a subsurface object location system;

FIG. 2 shows a plot to aid in understanding of a cyclic correlation technique.

FIG. 1 schematically shows a subsurface object location system which comprises a subsurface unit 1 mounted on an object 2 the position of which is to be monitored, four surface units 3 and a central unit 4. Each of the surface units 3 and the central unit 4 are provided at a surface S which might, for example, be a land surface, the surface of a body of water or a sea bed. The object 2, which might be an underwater vehicle or a drilling tool, is typically able to move in three dimensions through a liquid and/or solid environment below the surface S.

Typically the object location system will be used for location over relatively large distances, say in the order of hundreds or even thousands of meters.

The subsurface unit 1 comprises a inductive signal transmitter (not shown) and each of the surface units 3 includes an inductive signal receiver (not shown) which is suitable for receiving inductive signals transmitted from the subsurface unit 1. The central unit comprises processing means (not shown) for determining the position of the object 2. Each of the surface units 3 is connected by a high quality communications link 5 to the central unit 4. The communications links 5 are used to relay signals received by he surface units 3 to the central unit 4. The links are arranged to have high bandwidth and to have substantially constant characteristics. The characteristics of each link 5 are accurately determined and stored at the central unit so that the effect, primarily the delay, caused by transmission of a signal over each link can be determined by the central unit.

In operation, under predetermined conditions, the subsurface unit 1 transmits inductive signals which travel through the environment below the surface S. The transmission of signals may be continuous, periodic, triggered automatically or occur at the instruction of a user.

Typically the inductive signals will have a frequency in the very low frequency (vlf) range or low frequency (f) range. These frequencies are chosen because they propagate reasonably well through earth and sea water. A frequency of the order of 70 KHz can be effective and this leads to a wavelength in the order of 4 to 4.5 km. In some circumstances it is desirable to select the frequency of the signal such that the distance between the object 2 and surface units 3 is less than the wavelength of the signal.

The paths of an inductive signal from the subsurface unit 1 to the surface units 3, when the object 2 is in a first position, are shown by full lines 6 and the paths of an inductive signal from the subsurface unit 1a to the surface units 3, when the object 2a is in a second position are shown by dotted lines 6a.

It can be seen that the signal paths 6 when the object 2 is in the first position are of different lengths and different relative lengths than the signal paths 6a when the object 2a is in the second position. Provided that the positions of each of the surface units 3 are known then the position of the subsurface unit 1 and hence the object 2 can be determined by comparing the times at which a signal transmitted by the subsurface unit arrives at each of the surface units 3. This can be achieved by using time difference of arrival techniques such as are described in U.S. Pat. No. 4,888,593.

Conventional TDOA methods require high bandwidth signal channels, bandwidth being inversely related to resolution required. In the present system, as mentioned above, inductive signals having relatively long wavelengths are used. This means that it is difficult or impossible to provide useful location data by making single measurements to determine the time of arrival of a signal. Accuracy may be improved by statistical means by combining multiple measurements rather than merely noting the arrival time of say, a particular peak. It has been realised by the applicants that one way to help reduce bandwidth requirements and improve accuracy in the present system is to use cyclic cross correlation techniques such as those described in U.S. Pat. No. 4,888,593.

A currently preferred technique for determining the time of reception of the inductive signals uses cyclic correlation between the received signal and a synthesised signal. In this case a continuous, generally sinusoidal, signal is transmitted by the transmitting means (not shown) and received at each of the surface units 3. The frequency of the signal is such that the wavelength of the signal is greater the distance between the object 2 and the surface units 3. This ensures that the phase difference between the signal at the object 2 and each surface unit 3 is less than 360°. Similarly the phase differences between the signals received at each of the surface units 3 will be less than 360°. This ensures that the distances calculated do not suffer from inaccuracies due to amiguous phase differences.

In the technique, a cyclic correlation is performed between a selected portion of the signal received at each of the surface units and a synthesised signal having the same general form as the expected received signal. The timing/phase at the synthesized signal is changed until the correlation reaches a maximum, indicating that the received signal and synthesised signal are in phase. The time of a chosen reference point (for example, a particular zero crossing) on the synthesised signal can then be taken as the time of reception of the respective received signal. This process is repeated for all of the other received signals using the same reference point in the synthesised signal as the basis for time of reception. The number of cycles of the received signal used in calculating the correlation is a matter of design choice and depends on the resolution/speed desired and the amount of processing power to be used.

FIG. 2 is a plot to aid in understanding of the above technique and schematically shows an (idealised) signal R as received at one of the surface units 3 with a time of reception $t_r$ and a synthesised signal Y. The received signal R and synthesised signal Y are shown out of phase, a reference point P of the synthesised signal being coincident with zero time. In the method, as described above, the synthesised signal Y is shifted forward in time, so moving to the right on the plot, until the correlation function is maximised as the two signals R,Y coincide, In this state, the reference point P will coincide with the time of reception $t_r$, so that the value of $t_r$ can be determined. It should be noted that zero time mentioned above may not be the time at which the signal left the transmitter. Further, although the time of reception $t_r$ may be measured in absolute time, it is only necessary to be able to compare the times of reception at the various different surface units.

In the present embodiment when an appropriate inductive signal is received at one of the surface units 3, a relay signal is generated by that surface unit 3 and sent to the central unit 4 via the respective high quality link 5. When the same inductive signal from the subsurface unit 1 is received by the other surface units 3, respective relay signals are sent over the respective links 5 to the central unit 4. The central unit 4 is arranged to monitor the time of arrival of such signals and, by subtracting the delay caused by relaying the signal over the respective link 5, is able to determine the time of arrival of the inductive signal at each of the surface units 3. Hence by using the time difference of arrival techniques mentioned above, the central unit 5 car determine the position of the object 2.

In alternative embodiments rather than providing high quality links and performing a direct comparison at the central unit 4, each surface unit 3 may be arranged to determine the time of reception of an inductive signal by referring to a master clock provided by GPS. Each surface unit 3 can then send details of the time of arrival of the inductive signal to the central unit 4 via a standard communication link. The position of the object 2 may then be determined by the central unit 4 using time difference of arrival techniques as described above.

The signal transmitted for object location purposes may also be used to transmit data. It will be seen that the time of reception determining technique outlined above is unaffected if the signal is subject to say, amplitude modulation, in order to carry data. The transmitted data may serve many purposes and useful data rates say in the order of 5 kbits/second may be achieved. When the object being located is a survey vehicle, the data may comprise measurements taken by the survey vehicle such as temperature and pressure. The data may also be used to avoid any problems of ambiguous phase difference in a different way to that mentioned above. Data may also be transmitted from the surface to the subsurface object 2.

It will be appreciated that the precise positioning of the surface units 3 and central unit 4 is not critical, they merely need to be positioned in some convenient known location. Thus these units 3,4 may, for example, be suspended below a surface or buried in the ground. When so positioned, the units are still considered to be located at a surface for the purposes of this specification. In some circumstances, not having all of the surface units 3 in the same plane may assist in the location of the subsurface object.

For the avoidance of doubt, it is mentioned that in this application the term inductive signal is used to mean a magnetic rather than electric signal. In particular in is the magnetic vector of a propagating electromagnetic wave which is of concern and that is generated by the transmitter and received by the receivers.

What is claimed is:

1. Subsurface object location apparatus for determining the position of an object located below a surface, comprising:
    a subsurface unit having a transmitter and being arranged to be mounted on an object the location of which is to be monitored;
    a plurality of surface units disposed at spaced locations at the surface and each having a receiver; and
    a processing unit arranged for determining at least one of, the times of reception and relative times of reception at the plurality of receivers, of a signal transmitted from the transmitter and determining the location of the object on the basis of at least one of, the times and the relative times of reception, wherein the transmitter and receiver are arranged respectively to transmit and receive inductive signals and wherein said processing unit is arranged for performing a cyclic correlation to determine one of the times of reception and relative times of reception of the signal at each surface unit, said cyclic correlation being performed between the received signal and a synthesized signal.

2. Apparatus according to claim 1 in which the processing unit is arranged for taking a plurality of measurements of the signal received at each surface unit in order to determine the time of reception or relative time of reception of the signal at each surface unit.

3. Apparatus according to claim 1 in which four surface units are provided.

4. Apparatus according to claim 1 in which the signals used in determining the position of the object are also used to carry data.

5. Apparatus according to claim 1 in which the processing unit is arranged to compare the times of reception of the signal and to determine The location of the object on the basis of said comparison.

6. Apparatus according to claim 1 further comprising a central unit which is connected by a communication link to each of the surface units.

7. Apparatus according to claim 6 in which each communication link is a high quality link having known characteristics and the central unit is arranged to compare the time of reception by each surface unit, of a signal transmitted from the subsurface unit on the basis of the time of reception, at the central unit, of a relay signal passed from each surface unit and the known characteristics of the high quality links.

8. Apparatus according to claim 6 in which each surface unit is arranged to determine the time of reception of a signal from the subsurface unit by reference to a master clock and to relay a signal indicating the determined time of reception, via the respective link, to the central unit.

9. A method for determining the position of an object located below a surface, comprising the steps of:
    mounting a subsurface unit having a transmitter on the object;
    disposing at spaced locations at the surface a plurality of surface units each having a receiver;
    using the transmitter to transmit an inductive signal from the object;
    determining at least one of the times and relative times at which the inductive signal is received at each of the receivers;
    determining the location of the object on the basis of, at least one of the times and relative times of reception; and
    performing a cyclic correlation to determine, at least one of the times of reception and relative times of reception of the signal at each surface unit, said cyclic correlation being performed between the received signal and a synthesized signal.

10. A method according to claim 9 comprising the step of taking multiple measurements of the signal received at each surface unit in order to determine, at least one of the time of reception and relative time of reception of the signal at each surface unit.

11. A method according to claim 9 in which four surface units are provided.

12. A method according to claim 9 in which the signals used in determining the position of the object are also used to carry data.

13. A method according to claim 9 which includes the steps of comparing the times of reception of the signal and determining the location of the object on the basis of said comparison.

14. A method according to claim 9 comprising the step of connecting each of the surface units via a communication link to a central unit.

15. A method according to claim 14 in which each communication link is a high quality link having known characteristics and the method comprises the steps of, at the central unit, comparing the time of reception by each surface unit, of the signal transmitted from the subsurface unit on the basis of the time of reception, at the central unit, of a relay signal passed from each surface unit and the known characteristics of the high quality links.

16. A method according to claim 14 comprising the steps of, at each surface unit, determining the time of reception of the signal from the subsurface unit at the respective surface unit by reference to a master clock and relaying a signal indicating the time of reception via the respective link to the central unit.

* * * * *